P. BOUCARD AND L. LEMAIRE.
APPARATUS FOR ENLARGING PHOTOGRAPHS.
APPLICATION FILED JULY 16, 1918.

1,310,052.  Patented July 15, 1919.

Inventors:-
Pierre Boucard and
Louis Lemaire.
By:- B. Singer. Atty.

UNITED STATES PATENT OFFICE.

PIERRE BOUCARD, OF PARIS, AND LOUIS LEMAIRE, OF LA GARENNE-COLOMBES, FRANCE.

APPARATUS FOR ENLARGING PHOTOGRAPHS.

1,310,052.  Specification of Letters Patent.  Patented July 15, 1919.

Application filed July 16, 1918.  Serial No. 245,233.

*To all whom it may concern:*

Be it known that we, PIERRE BOUCARD, residing at Paris, France, and LOUIS LEMAIRE, residing at La Garenne-Colombes, France, have invented new and useful Improvements in Apparatus for Enlarging Photographs, of which the following is a specification.

This invention relates to apparatus for the enlarging of photographs.

Its object is to produce an apparatus which will easily and quickly reproduce on sensitized paper, post cards or the like on an enlarged scale the whole or part, as required, of the image of a negative on glass or other transparency.

The invention is combined in such a manner that the frosted glass with which the apparatus is provided and on which is projected the enlarged image to be received by the sensitized sheet allows the operator to verify whether the conditions required are fulfilled.

A further characteristic of the apparatus is that artificial light being employed any laboratory can be employed to make the enlargements in the evening and the source of light can be fixed relative to the apparatus but at the same time giving a perfect image with a remarkable softness of contour.

In order that the invention may be fully understood it will be described by way of example with reference to the accompanying drawings in which—

Figure 1:
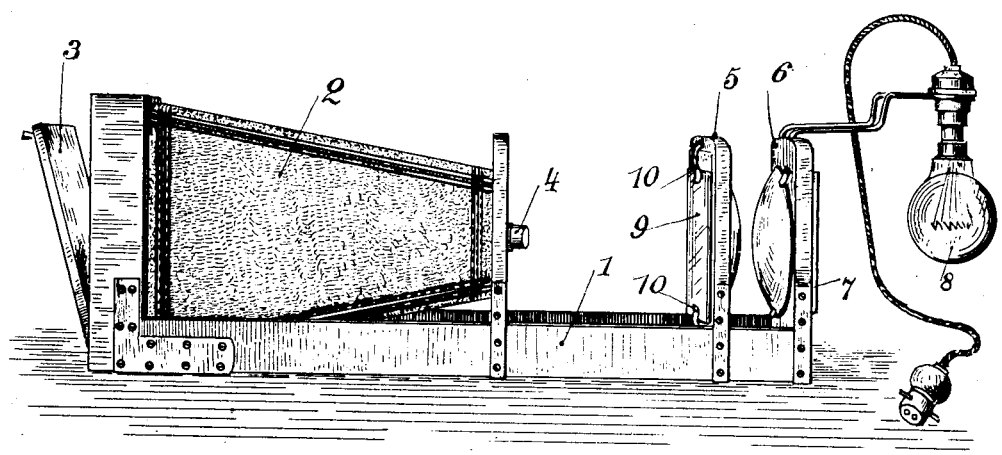
Figure 1 is a perspective view of the apparatus.

In the drawings, 1 is the base of the apparatus carrying the cone 2 which is light proof and is closed at its rear by the end 3 to which is applied on its inner face the sheet of sensitized medium to receive the enlarged image on a plate of transparent glass suitably arranged.

The two brackets 5 and 6 are each provided with a plane-convex lens so arranged to form a condenser.

In front of the lens carried by the bracket 6 is placed a plate of frosted glass 7 to diffuse the light from the lamp 8 which may be electric, incandescent gas, acetylene, or the like.

The negative on glass or other transparency of the image to be enlarged is placed on the plane face of the lens carried by the bracket 5 and is held in position by the plate of glass 9 supported by the springs 10 which can be displaced sidewise.

When the negative, the image of which is to be reproduced either partially or wholly on a larger scale, is placed in position, the correctness of its position can be verified by placing a sheet of frosted glass against the sheet of transparent glass before the sensitized sheet is placed thereon.

The possibility of easy control is of great advantage when only part of the negative is to be reproduced, it being indispensable in such a case to be able to ascertain that such parts are reflected as desired on to the glass 3.

The presence of the diffusing glass 3 in front of the condenser is such that not only is the image reproduced good and softened in its contour but the distance between the source of light 8 and the condenser need not be absolutely correct.

In this apparatus, as is readily seen, all the parts are accessible, visible and capable of verification at any moment.

Figure 2:
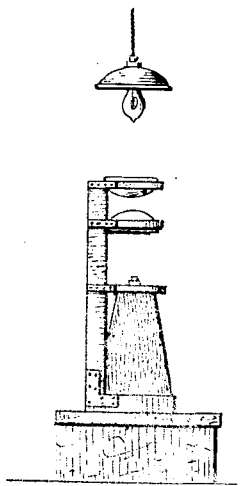
Fig. 2 shows on a similar scale a modified form of the invention.

Fig. 2 shows a modification of the apparatus which can be used vertically without any inconvenience.

It may be pointed out that against the sheet of glass 9 can be applied a design, a photographic negative of which can be taken larger than that placed between the end 3 and the corresponding transparent glass, the artificial light in this case being placed between the objective and the design or the photograph to be reproduced and directed obliquely thereonto.

The lens is adapted to be very rigidly mounted such mounting being preferably brought forth by clamping the same rigidly between two washers, so that the same having once been focused no possible movement of the lens may take place to throw the image out of focus.

Having now particularly described and ascertained the nature of our said invention and in what manner the same is to be performed, we declare that what we claim is:

1. Photograph enlarging apparatus comprising a base, a light proof cone arranged on the base and having an objective lens at the smaller end and means at the larger end for holding a sensitized sheet; a pair of brackets on the base, condenser lenses carried by the brackets, one of said brackets also having negative holding means, and the other bracket being provided with a light diffusing sheet, and a source of light spaced from said sheet.

2. Photograph enlarging apparatus comprising a base, a light proof cone arranged on the base and having an objective lens at the smaller end and means at the larger end for holding a sensitized sheet; a pair of brackets on the base, condenser lenses carried by the brackets, one of said brackets also having negative holding means, the other bracket having a light diffusing sheet and also having supporting means for a lamp.

In testimony whereof we affix our signatures in presence of two witnesses.

DR. PIERRE BOUCARD.
LOUIS LEMAIRE.

Witnesses:
JOHN F. SIMONS,
G. RODECKY.